(12) United States Patent
Ramos Ibarra et al.

(10) Patent No.: US 11,349,366 B2
(45) Date of Patent: May 31, 2022

(54) WINDING OVERHANG

(71) Applicant: Otis Elevator Company, Farmington, CT (US)

(72) Inventors: Enrique Ramos Ibarra, Madrid (ES); Carlos Fernandez Troconiz, Madrid (ES); Jose Manuel Sancho, Madrid (ES); Jose Ramon Martinez de Icaya, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 255 days.

(21) Appl. No.: 16/680,970

(22) Filed: Nov. 12, 2019

(65) Prior Publication Data
US 2020/0153308 A1 May 14, 2020

(30) Foreign Application Priority Data
Nov. 12, 2018 (EP) ..................................... 18205697

(51) Int. Cl.
H02K 3/52 (2006.01)
B66B 9/00 (2006.01)
B66B 11/04 (2006.01)
H02K 15/00 (2006.01)

(52) U.S. Cl.
CPC .............. *H02K 3/522* (2013.01); *B66B 9/00* (2013.01); *B66B 11/043* (2013.01); *H02K 15/0068* (2013.01)

(58) Field of Classification Search
CPC ........ H02K 3/28; H02K 3/38; H02K 2203/09; H02K 2203/12
USPC .................................................. 310/214, 215
See application file for complete search history.

(56) References Cited

U.S. PATENT DOCUMENTS

| 8,044,543 B2 | 10/2011 | Zhang |
| 10,044,240 B2 | 8/2018 | Kim et al. |
| 10,044,241 B2 | 8/2018 | Nakatake et al. |
| 2015/0101890 A1* | 4/2015 | Culp ..................... B66B 1/3492 187/305 |
| 2016/0352170 A1 | 12/2016 | Wang et al. |

(Continued)

FOREIGN PATENT DOCUMENTS

| CN | 103248145 B | 8/2013 |
| CN | 207490638 U | 6/2018 |

(Continued)

OTHER PUBLICATIONS

European Search Report for application EP 18205697.8, dated May 21, 2019, 9 pages.

*Primary Examiner* — Quyen P Leung
*Assistant Examiner* — Minki Chang
(74) *Attorney, Agent, or Firm* — Cantor Colburn LLP

(57) ABSTRACT

A winding overhang (20) configured for supporting windings of an electric motor (40) comprise a cylindrical wall (22) extending around a center axis (A). The cylindrical wall (22) includes a plurality of grooves (28a-28e) formed along the circumference (37, 38) of the cylindrical wall (22), each groove (28a-28e) having a constant width (W) along the circumference (37, 38); and a plurality of openings (26) having different heights (H1, H2, H3, H4, H5). Each opening (26) extends from an end surface (36) of cylindrical wall (22) and allows a wire (30a-30c) to pass between an outer area (34) outside the cylindrical wall (22) and an inner space (32) defined by the cylindrical wall (22).

14 Claims, 6 Drawing Sheets

(56) References Cited

U.S. PATENT DOCUMENTS

| | | |
|---|---|---|
| 2017/0141627 A1 | 5/2017 | Seki et al. |
| 2018/0183290 A1 | 6/2018 | Wust et al. |

FOREIGN PATENT DOCUMENTS

| | | |
|---|---|---|
| CN | 108258827 A | 7/2018 |
| EP | 1467466 A2 | 10/2004 |
| EP | 1947755 A1 | 7/2008 |
| EP | 2149190 B1 | 10/2015 |
| EP | 3098947 A1 | 11/2016 |
| EP | 3176915 A1 | 6/2017 |
| EP | 1990899 B1 | 7/2017 |
| EP | 2457864 B1 | 1/2018 |
| WO | 2016017030 A1 | 2/2016 |
| WO | 2016177366 A1 | 11/2016 |
| WO | 2016184720 A1 | 11/2016 |
| WO | 2018019475 A1 | 2/2018 |

\* cited by examiner

WINDING OVERHANG

FOREIGN PRIORITY

This application claims priority to European Patent Application No. 18205697.8, filed Nov. 12, 2018, and all the benefits accruing therefrom under 35 U.S.C. § 119, the contents of which in its entirety are herein incorporated by reference.

BACKGROUND

The invention relates to a winding overhang ("winding head") for an electric motor, in particular for a stator or a rotor of an electric motor employed in an elevator system. The invention further relates to an elevator motor and to an elevator system comprising such a winding overhang and to a method of forming windings, in particular stator windings, on a winding overhang.

An elevator system typically comprises at least one elevator car moving along a hoistway extending between a plurality of landings. An elevator system further comprises an elevator drive including an electric motor for driving the elevator car. An electric motor typically includes a rotor mounted to a rotating shaft and a stationary stator configured for interacting with the rotor. In an inner rotor configuration, the stator surrounds the rotor. In an outer rotor configuration, the rotor surrounds the stator. In an axial rotor configuration, the rotor is arranged next to the stator in an axial direction.

In a common configuration, in particular in a configuration in which the rotor is equipped with permanent magnets, the stator comprises a plurality of electric windings ("stator windings" or coils) formed on a winding overhang providing a stator support. In an alternative configuration, the stator is equipped with permanent magnets, and the rotor comprises a plurality of electric windings ("rotor windings" or coils) formed on a winding overhang providing a rotor support.

In both configurations, the rotor may be driven by means of electromagnetic forces generated by electric currents flowing through the electric windings forming a rotating electromagnetic field.

It is desirable to provide a winding overhang which allows for an easy formation of the electric windings and which reduces the risk of failure of the electric motor, in particular the risk of failures caused by electric short circuits.

BRIEF DESCRIPTION

According to an exemplary embodiment of the invention, a winding overhang, which is configured for supporting the electric windings of an electric motor, in particular for a stator or a rotor of an electric motor, comprises a cylindrical wall having an end surface and a circumference extending around a center axis. A plurality of grooves are formed along the circumference of the cylindrical wall. Further, a plurality of openings are formed within the cylindrical wall. Each opening extends from the end surface of the cylindrical wall to a respective one of the grooves and allows passing a wire through the cylindrical wall between an area outside the cylindrical wall and an inner space defined by the cylindrical wall. The openings have different heights, so that adjacent openings extend to different ones of said grooves.

Exemplary embodiments of the invention also include a stator with a winding overhang according to an exemplary embodiment of the invention and a plurality of electric windings arranged within or outside the interior space along the cylindrical wall, wherein wires forming the electric windings pass through the openings formed within the cylindrical wall between the interior space and the area outside the cylindrical wall.

Exemplary embodiments of the invention also include a rotor with a winding overhang according to an exemplary embodiment of the invention and a plurality of electric windings arranged along the cylindrical wall, wherein wires forming the electric windings pass through the openings formed within the cylindrical wall between the interior space and the area outside the cylindrical wall.

Exemplary embodiments of the invention further include an electric motor comprising a stator or a rotor according to an exemplary embodiment of the invention, an elevator drive comprising such an electric motor, and an elevator system comprising such an elevator drive.

Exemplary embodiments of the invention further include a method of forming a stator or a rotor on a winding overhang according to an exemplary embodiment of the invention. The method includes forming and/or arranging electric windings within the inner space defined by the cylindrical wall and passing wires extending from the ends of said electric windings through the openings formed within the cylindrical wall between the inner space and the area outside the cylindrical wall.

A winding overhang according to an exemplary embodiment allows for a well-defined and neat arrangement of the wires forming the electric windings, thereby facilitating the formation of the electric windings. A winding overhang according to an exemplary embodiment further allows preventing crossings of the wires, thereby reducing the risk of short-circuit. A winding overhang according to an exemplary embodiment in particular allows for a fully automated formation of the windings, e.g. using a needle winding technique. When the wire comes out of a slot (output slot), the winding machine will automatically position the needle at the same height of the designed groove for that wire and, rotating the winding overhang, guide the wire up to the next slot, where the wire is put into the next slot (input slot).

As a result, the costs for producing an electric motor, which in particular may be employed in an elevator system, may be reduced. Further, the reliability of the electric motor and the elevator system, in which the motor is employed, may be enhanced.

A number of optional features are set out in the following. These features may be realized in particular embodiments, alone or in combination with any of the other features, unless specified otherwise.

The openings formed within the cylindrical wall may be formed as slots extending parallel to the center axis. Such a configuration allows for an easy manufacturing of the openings at low costs.

Adjacent openings may extend to different ones of the grooves. Such a configuration allows avoiding wire-crossings, in particular the crossing of wires extending from the same electric winding, by guiding the wires passing though adjacent openings into different grooves.

Each groove may extend in a virtual plane oriented orthogonally to the center axis at a constant height of the cylindrical wall. Each groove may have a basically constant width along the circumference of the cylindrical wall.

In other words, the grooves do not comprise links or steps configured for guiding a wire accommodated within a respective one of the grooves to a different level of height. Each groove having a basically constant width does not exclude the width of the grooves from fluctuating due to manufacturing tolerances as long as these fluctuations do not allow the position (height) of a wire accommodated within the respective groove to change considerably and/or intentionally.

In a direction extending parallel to the center axis, the grooves may be spaced apart from each other equidistantly in order to allow for a uniform distribution of the wires along the height of the cylindrical wall.

Three to five grooves may be formed within the cylindrical wall. The number of grooves in particular may at least correspond to the number of electric phases of the motor in which a stator comprising a winding overhang according to an exemplary embodiment is to be employed.

The cylindrical wall may be formed by a plurality of posts extending basically orthogonally from a base which is oriented perpendicularly to the center axis. The posts may be arranged next to each other along a circular line centered around the center axis. The plurality of grooves may be formed on outer surfaces of the posts facing away from the center axis. In alternative configurations, the plurality of grooves may be formed on inner surfaces of the posts facing towards the center axis.

Gaps may be formed between two adjacent posts, respectively. The winding overhang may comprise webs bridging the gaps. Not more than a single web may bridge each gap, respectively. The webs may extend parallel to the base perpendicularly to the center axis. The webs bridging the different gaps may be arranged at different heights, i.e. at different distances from the end surface of the cylindrical wall formed by the posts. These heights in particular may correspond to the heights of the grooves formed on the outer surfaces of the posts.

The winding overhang may comprise winding supports extending from the cylindrical wall, each winding support being configured for supporting an electric winding. Winding supports facilitate the forming of the electric windings along the cylindrical wall.

In a stator or rotor according to an exemplary embodiment of the invention, only a single wire may pass through each of the openings, respectively. In particular, the "input" and "output" wires of each electric winding may pass though different openings, respectively. Such a configuration allows avoiding wire-crossings in order to reduce the risk of short-circuiting the wires.

In order to avoid wire-crossings, wires passing through adjacent openings may be accommodated in different grooves. Adjacent openings may have different heights thereby extending to different slots. Such a configuration facilitates guiding wires passing through adjacent openings into different grooves.

In a stator or rotor according to an exemplary embodiment of the invention, the wires may extends within the grooves formed along the circumference of the cylindrical wall in order to secure a proper arrangement of the wires. Guiding the wires along predefined grooves further facilitates the manufacturing of the stator or rotor.

In order to reduce the risk of short-circuits, in each angular section of the cylindrical wall, each groove may accommodate not more than one wire, i.e. not more than a single wire may extend within each of the openings in each angular section of the cylindrical wall.

Each wire in particular may pass from one of the grooves through one of the openings from the outer area into the inner space, form an electric winding on one of the winding supports, and then pass through another one of the openings from the inner space back to the outer area and into another one of the grooves.

DRAWING DESCRIPTION

In the following, exemplary embodiments of the invention are described in more detail with respect to the enclosed figures:

FIG. 1 schematically depicts an elevator system in which an electric motor comprising a winding overhang according to an exemplary embodiment of the invention may be employed.

DETAILED DESCRIPTION

Figure 1:
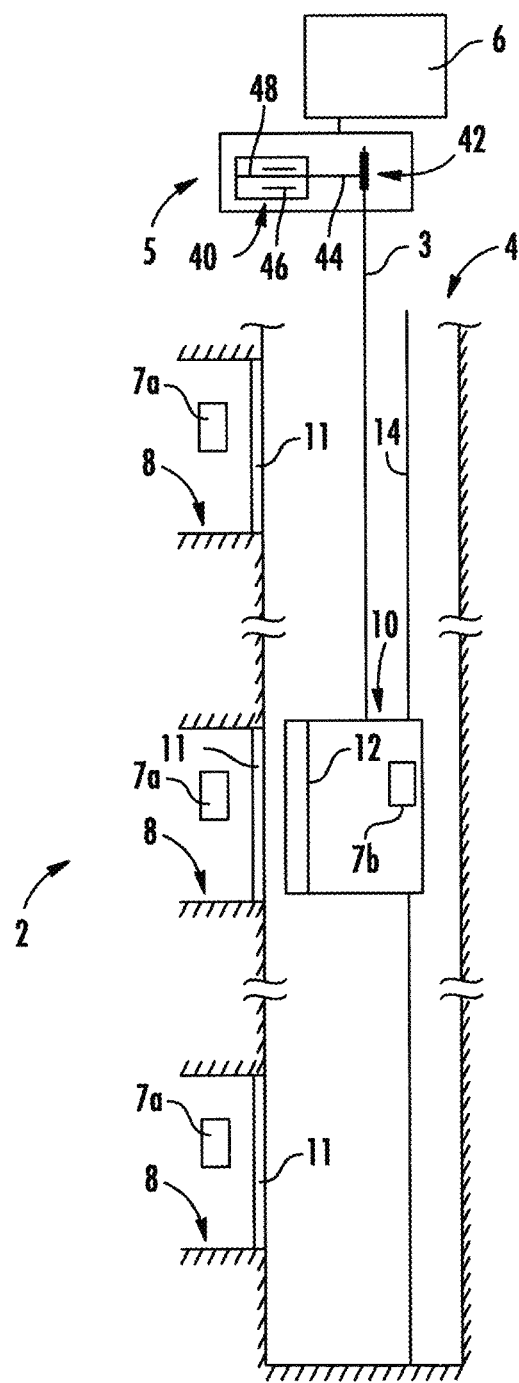

FIG. 1 schematically depicts an elevator system in which an electric motor 40 comprising a winding overhang 20 (see FIG. 2) according to an exemplary embodiment of the invention may be employed.

The elevator system 2 includes an elevator car 10 movably arranged within a hoistway 4 extending between a plurality of landings 8. The elevator car 10 in particular is movable along a plurality of car guide members 14, such as guide rails, extending along the vertical direction of the hoistway 4. Only one of said car guide members 14 is visible in FIG. 1.

Although only one elevator car 10 is depicted in FIG. 1, the skilled person will understand that exemplary embodiments of the invention may include elevator systems 2 having a plurality of elevator cars 10 moving in one or more hoistways 4.

Each landing 8 is provided with a landing door 11, and the elevator car 10 is provided with a corresponding elevator car door 12 for allowing passengers to transfer between a landing 8 and the interior of the elevator car 10 when the elevator car 10 is positioned at the respective landing 8.

The elevator car 10 is movably suspended by means of a tension member 3. The tension member 3, for example a rope or belt, is connected to an elevator drive 5, which is configured for driving the tension member 3 in order to move the elevator car 10 along the height of the hoistway 4 between the plurality of landings 8, which are located on different floors.

The exemplary embodiment of the elevator system 2 shown in FIG. 1 employs a 1:1 roping for suspending the elevator car 10. The skilled person, however, easily understands that the type of the roping is not essential for the invention and that different kinds of roping, e.g. a 2:1 roping, may be used as well. The elevator system 2 may have a machine room or may be a machine room-less elevator system. The elevator system 2 may use a tension member 3, as it is shown in FIG. 1, or it may be an elevator system without a tension member 3.

Optionally, the elevator system 2 may further include a counterweight (not shown) attached to the tension member 3 and moving concurrently and in opposite direction with respect to the elevator car 10 along at least one counterweight guide member (not shown).

The tension member 3 may be a rope, e.g. a steel wire rope, or a belt. The tension member 3 may be uncoated or may have a coating, e.g. in the form of a polymer jacket. In a particular embodiment, the tension member 3 may be a belt comprising a plurality of polymer coated steel cords (not shown).

The elevator drive 5 in particular comprises an electric motor 40 and a sheave or drum 42, which is mounted to a rotating shaft 44 driven by the electric motor 40. The tension member 3 extends over the outer periphery of the sheave or drum 42 so that the elevator car 10 may be moved by rotating the sheave or drum 42.

The electric motor 40 comprises a rotor 48 attached to the rotating shaft 44 and a stationary stator 46 surrounding the rotor 48. Although not explicitly shown in the figures, exemplary embodiments of the invention also include electric motors in which an outer rotor surrounds the stator.

The elevator drive 5 is controlled by an elevator control 6 for moving the elevator car 10 along the hoistway 4 between the different landings 8.

Input to the elevator control 6 may be provided via landing control panels 7a, which are provided on each landing 8 in the vicinity the landing doors 11, and/or via an elevator car control panel 7b provided inside the elevator car 10.

The landing control panels 7a and the elevator car control panel 7b may be connected to the elevator control 6 by means of electric wires, which are not shown in FIG. 1, in particular by an electric bus, such as a field bus/CAN-bus, or by means of wireless data connections.

Figure 2:
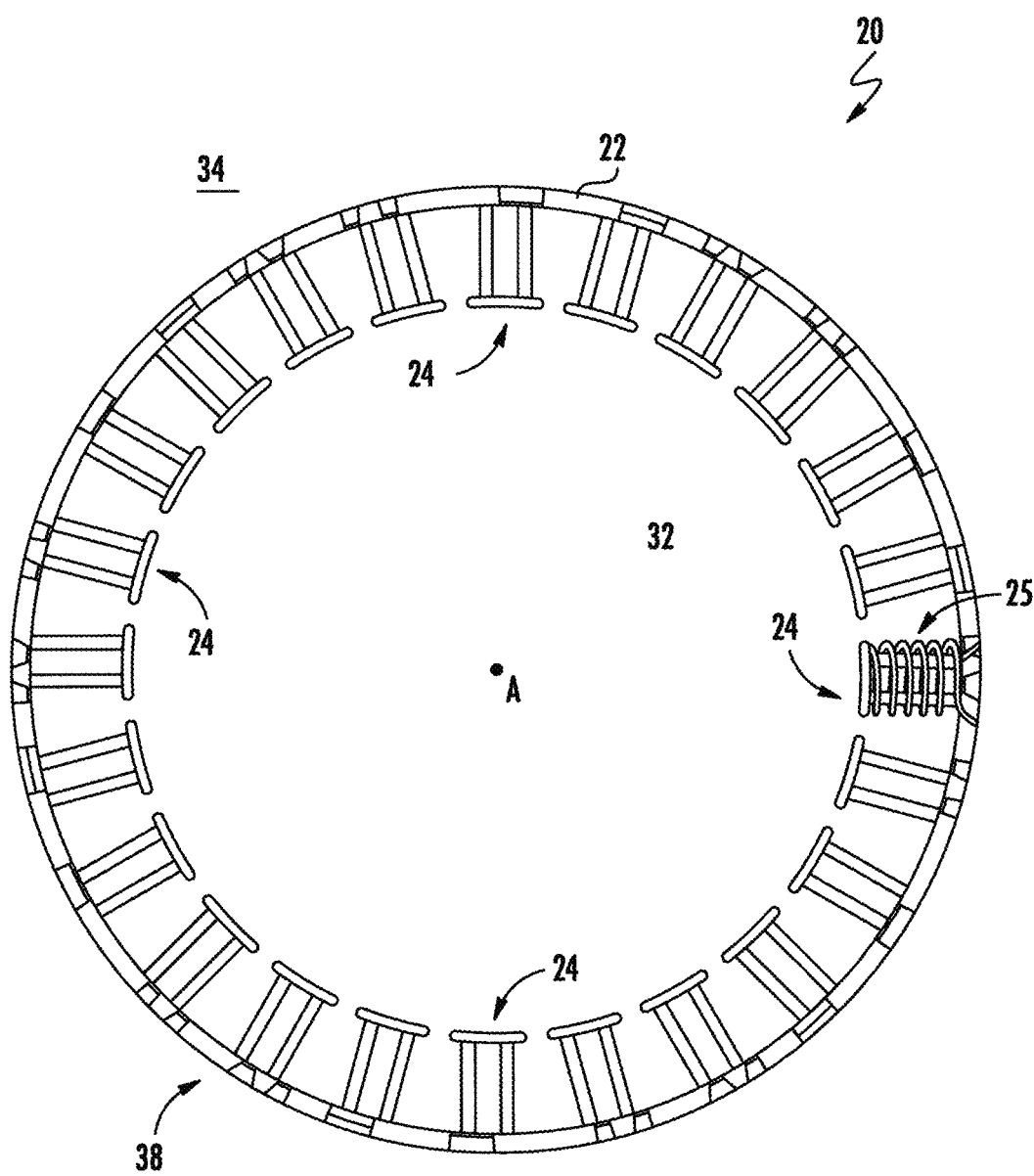
FIG. 2 shows a sectional view of a winding overhang.

FIG. 2 shows a sectional view through a winding overhang 20, as it may be used for manufacturing the stator 46 or the rotor 48 of the electric motor 40.

The winding overhang 20 comprises a cylindrical wall 22 centered around a center axis A. The center axis A corresponds to the rotational axis of the electric motor 40.

In the cross-sectional view depicted in FIG. 2, the center axis A extends perpendicularly to the plane of projection of FIG. 2. In said cross-sectional view, the cylindrical wall 22 forms an outer ring centered around the center axis A.

The cylindrical wall 22 separates a cylindrical inner space 32 bounded by the cylindrical wall 22 from an outer area 34 outside the cylindrical wall 22. A plurality of winding supports 24 extend from the cylindrical wall 22 in a radial direction towards the center axis A. For reasons of clarity, only some of the winding supports 24 are denoted with reference signs in FIG. 2.

In an alternative configuration, which is not shown in the figures, the winding supports 24 may extend outwards from the cylindrical wall 22 in a radial direction, i.e. away from the center axis A.

For forming the stator 46 or the rotor 48, respectively, electric wires 30a-30c (not shown in FIG. 2) are wound around the winding supports 24 forming electric windings 25. Only one winding 25 is exemplarily depicted in FIG. 2.

Figure 3:
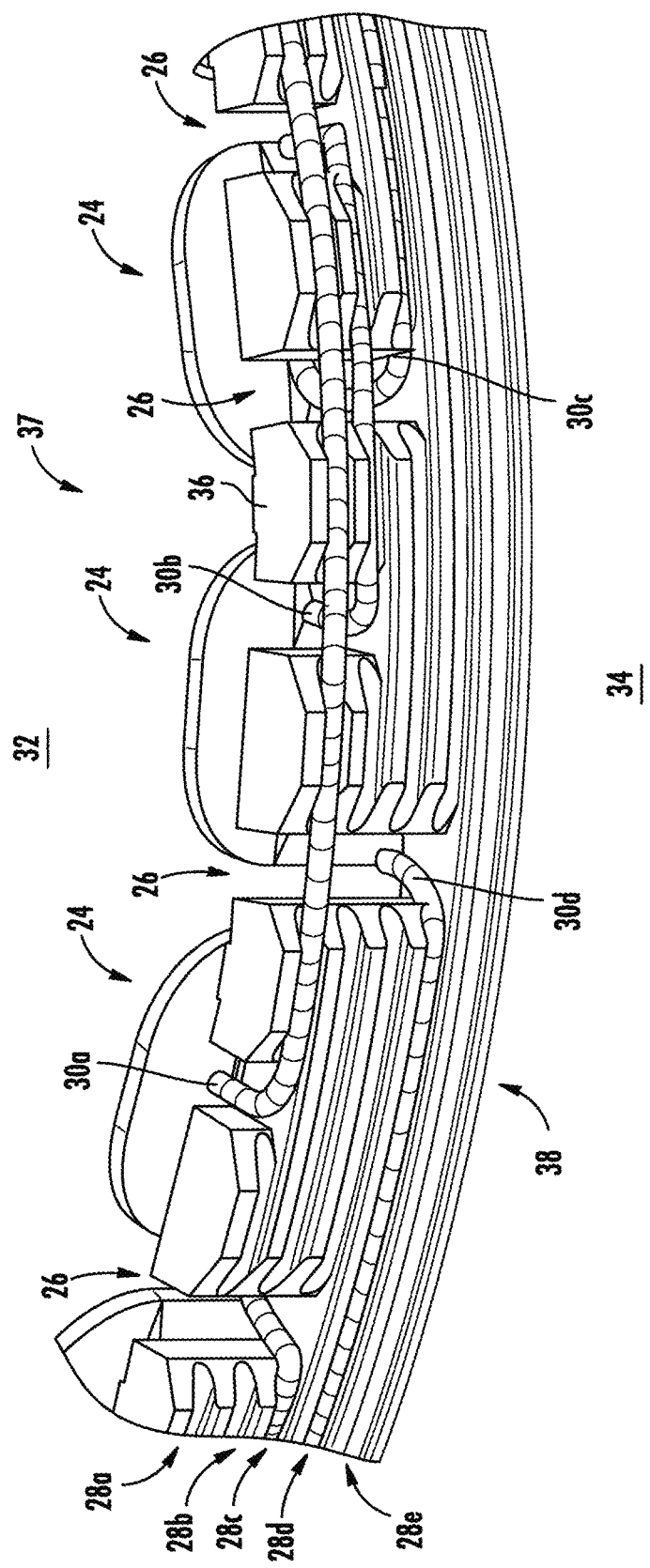
FIG. 3 depicts a perspective view of a portion of the cylindrical wall of a winding overhang according to an exemplary embodiment of the invention.
Figure 4:
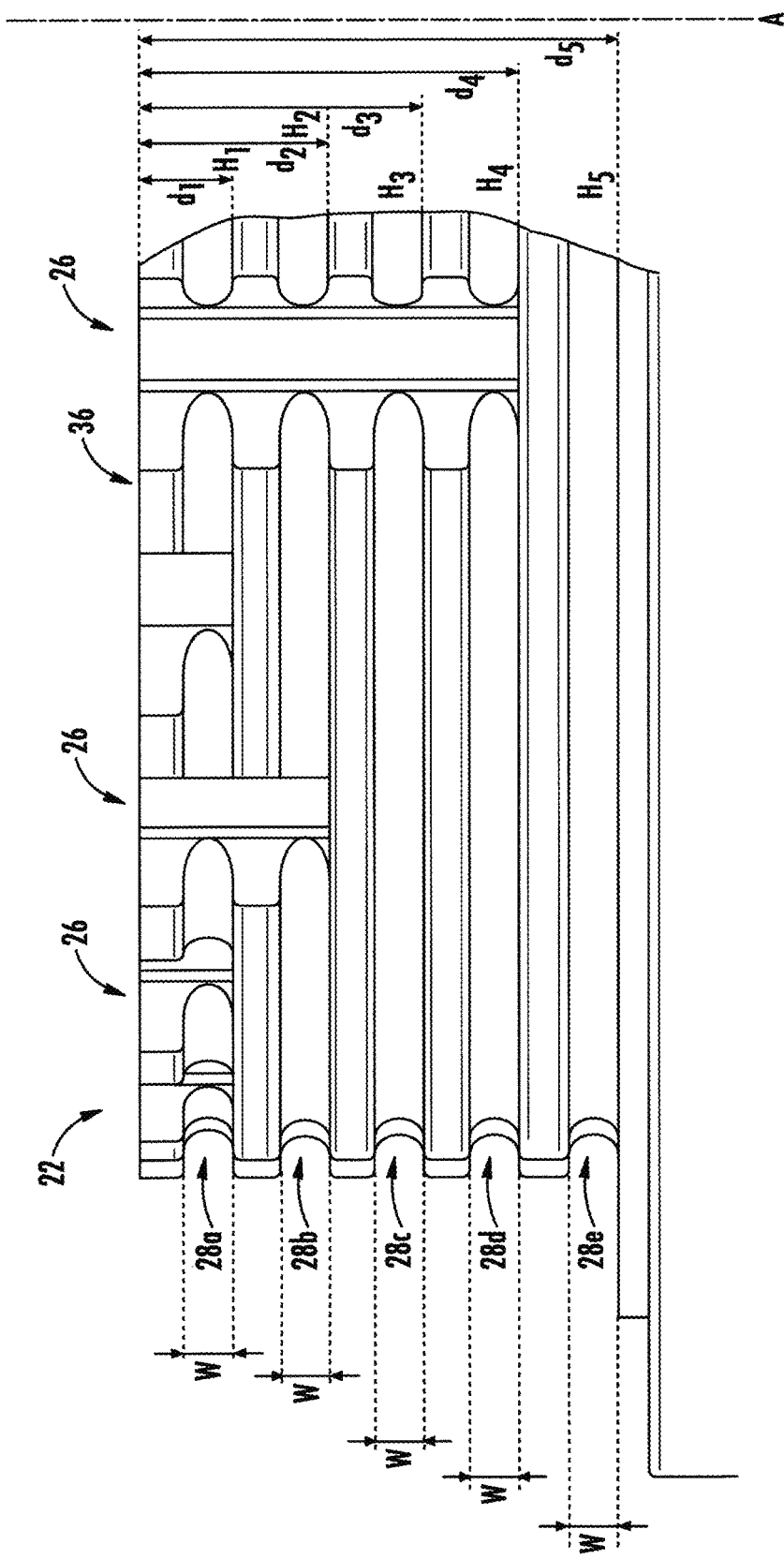
FIG. 4 depicts a side view of a portion of the cylindrical wall of a winding overhang according to an exemplary embodiment of the invention.

FIG. 3 depicts a perspective view of a portion of the cylindrical wall 22, and FIG. 4 depicts a side view thereof.

The cylindrical wall 22 has an end surface 36 facing in the axial direction and an outer circumference 38 extending around the center axis A. A plurality of grooves 28a-28e are formed along the outer circumference 38 of the cylindrical wall 22.

In an alternative configuration, which is not shown in the figures, in particular in a configuration in which the winding supports 24 extend outwards from the cylindrical wall 22, the grooves 28a-28e may be formed along an inner circumference 37 of the cylindrical wall 22.

Each groove 28a-28e extends in a virtual plane, which is oriented orthogonally to the center axis A at a constant height H1, H2, H3, H4, H5, i.e. at a predefined distance $d_1$, $d_2$, $d_3$, $d_4$, $d_5$ from the end surface 36 (see FIG. 4) of the cylindrical wall 22. Each groove 28a-28e has a basically constant width W along the outer circumference 38. In the embodiment depicted in FIGS. 2 and 3, all grooves 28a-28e have basically the same width W.

The grooves 28a-28e in particular are spaced apart equidistantly from each other in the direction parallel to the center axis A (not shown in FIG. 3), which corresponds to the vertical direction in FIGS. 3 and 4.

In addition to the grooves 28a-28e, a plurality of openings 26 are formed in the cylindrical wall 22. The openings 26 are formed as slots extending from the end surface 36 of the cylindrical wall 22 (the upper end surface 36 in the orientation shown in FIGS. 2 and 3) in a direction parallel to the direction of the center axis A. Each opening 26 ends at a predefined height H1, H2, H3, H4, H5 of the cylindrical wall 22, i.e. at a predefined distance d1, d2, d3, d4, d5 from the end surface 36.

Each of the openings 26 in particular ends at a height H1, H2, H3, H4, H5 corresponding to the height H1, H2, H3, H4, H5 of one of the grooves 28a-28e, respectively. The bottom ends of two adjacent openings 26 are arranged at different heights H1, H2, H3, H4, H5, i.e. adjacent openings 26 end at heights H1, H2, H3, H4, H5 corresponding to different grooves 28a-28e, respectively.

In other words, each two adjacent openings 26 assigned to the same winding support 24 extend from the end surface 36 to different ones of the grooves 28a-28e.

The openings 26 extend completely through the cylindrical wall 22 allowing wires 30a-30c extending from the windings 25, which are not shown in FIGS. 3 and 4, formed on the winding supports 24 within the interior space 32 to pass through the cylindrical wall 22 into one of the grooves 28a-28e formed along the outer circumference 38 of the cylindrical wall 22. Within any angular section along the circumference 37, 38 of the cylindrical wall 22, each groove 28a-28e accommodates not more than one of the wires 30a-30c.

The wires 30a-30c in particular pass through the cylindrical wall 22 at the bottom of the respective opening 26, and extend in to a groove 28a-28e aligned with the bottom of the respective opening 26.

Such a configuration results in a well-defined and neat arrangement of the wires 30a-30c along the cylindrical wall 22.

Only one wire 30a-30c passes through each of the openings 26. In consequence, wires 30a-30c extending from both ends of each electric winding 25 ("input" and "output" of the respective electric winding 25) pass the cylindrical wall 22 through different openings 26 at different heights H1, H2, H3, H4, H5.

Figure 5:
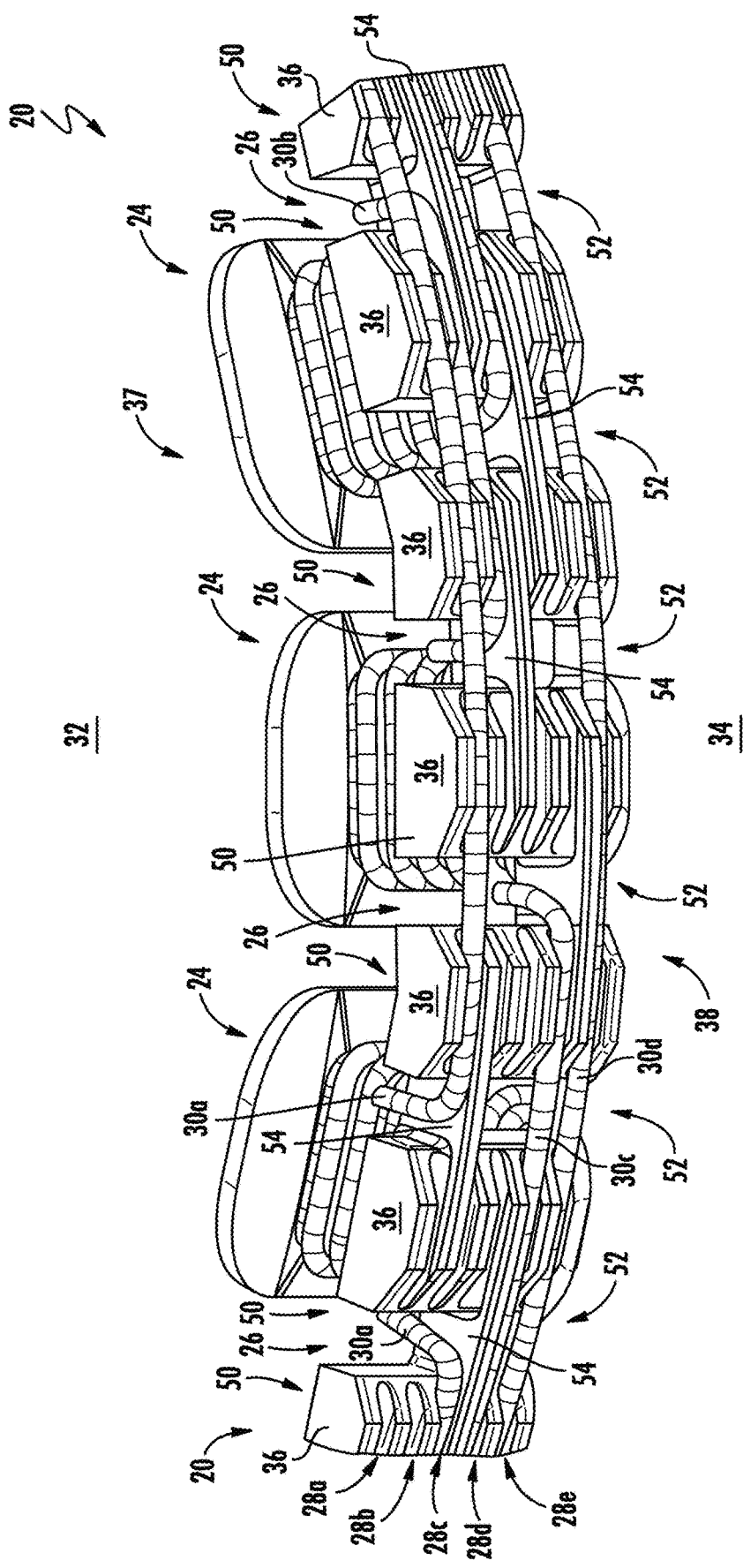
FIG. 5 depicts a perspective view of a portion of the cylindrical wall of a winding overhang according to another exemplary embodiment of the invention.
Figure 6:
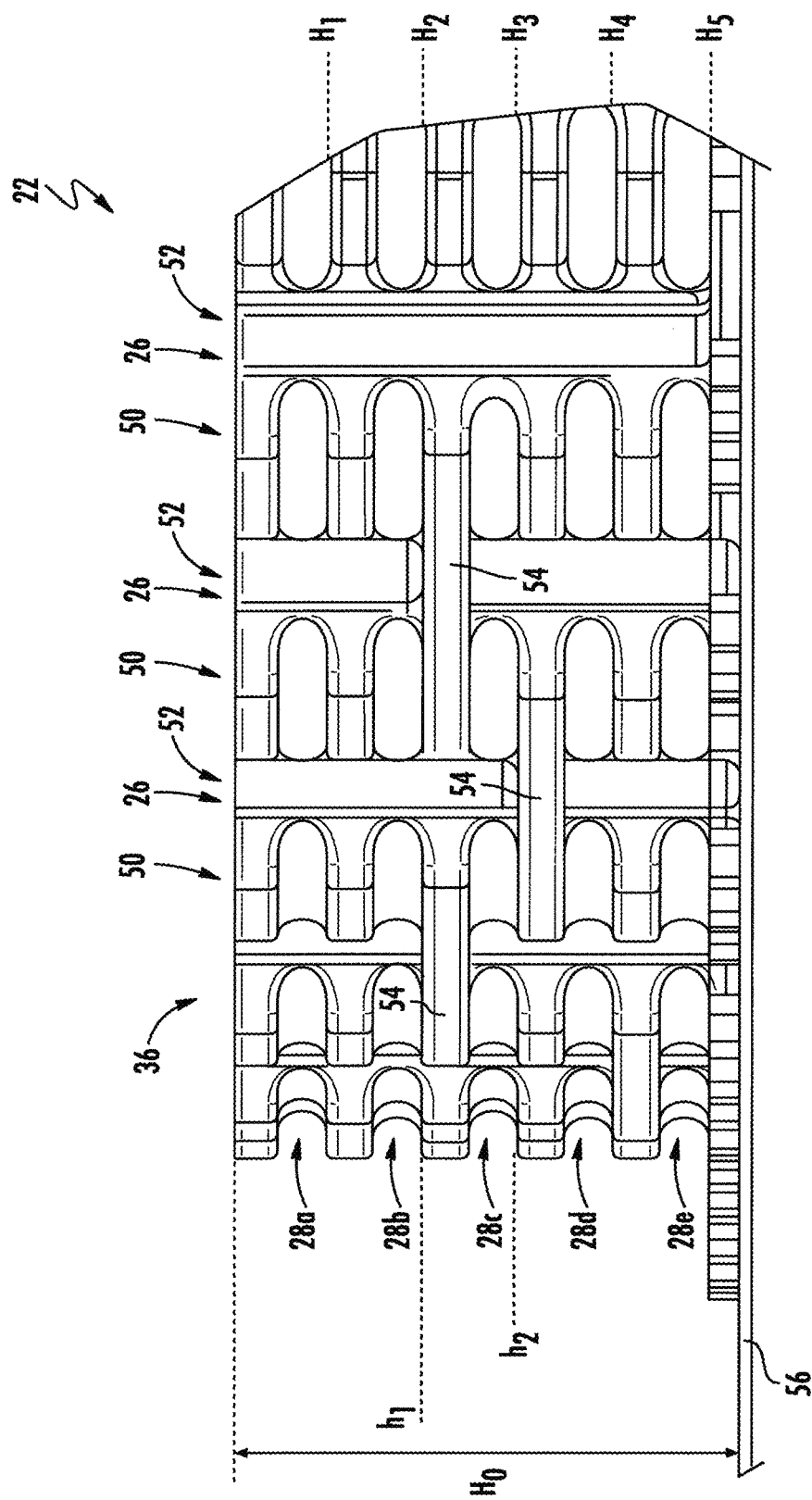
FIG. 6 depicts a side view of a portion of the cylindrical wall of a winding overhang according to the exemplary embodiment depicted in FIG. 5.

FIG. 5 depicts a perspective view of a portion of the cylindrical wall 22 of a winding overhang 20 according to another exemplary embodiment of the invention. FIG. 6 depicts a side view of a portion of the cylindrical wall 22 of a winding overhang 20 according to the exemplary embodiment depicted in FIG. 5.

In the exemplary embodiment depicted in FIGS. 5 and 6, the cylindrical wall 22 is formed by a plurality of posts 50 extending basically orthogonally from a base 56 (only shown in FIG. 6) which is oriented perpendicularly to the center axis A (cf. FIG. 2). The posts 50 are arranged next to each other along a virtual circular line (not shown) centered around the center axis A.

Similar to the embodiment depicted in FIGS. 3 and 4, a plurality of grooves 28a-28e are formed on the outer surfaces of the posts 50 facing away from the center axis A. In an alternative configuration, which is not shown in the figures, grooves 28a-28e may be formed on the inner surfaces of the posts 50 facing towards the center axis A.

Vertical gaps 52 are formed between two adjacent posts 50, respectively, allowing wires 30a-30c (not shown in FIG. 5) to pass through. The posts 50, and in consequence the gaps 52, are identical in height $H_0$ (see FIG. 6).

Each gap 52 is bridged by a single web 54 extending between two adjacent posts 50. The webs 54 bridging the gaps 52 are arranged at different heights h1, h2. Each of the heights h1, h2 of the webs 54 in particular corresponds to one of the heights H1, H2, H3, H4, H5 of the grooves 28a-28e formed on the outer surfaces of the posts 50, respectively.

Thus, when viewed from the end surface 36 of the cylindrical wall 22 formed by the posts 50, i.e. from the top of the cylindrical wall 22 in the orientation depicted in FIGS. 5 and 6, the webs 54 delimit the depths of the gaps 52. By delimiting the depths of the gaps 52, the webs 54 form openings 26 having different heights H1, H2, H3, H4, H5 similar to the openings 26 formed in the cylindrical will 22 of the embodiment depicted in FIGS. 3 and 4.

The embodiment depicted in FIG. 5 allows reducing the amount of material needed for forming the winding overhang 20. In consequence, the weight and the material costs of the winding overhang 20 as well as of a stator 46 and a motor 40 employing such a winding overhang 20 may be reduced.

In stator 46, which is formed using a winding overhang 20 according to an exemplary embodiment of the invention, no wires 31a-32c cross each other. This results in a reliable insulation between the wires 30a-30c and considerably reduces the risk of short circuits.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention shall not be limited to the particular embodiment disclosed, but that the invention includes all embodiments falling within the scope of the dependent claims.

REFERENCES 2 elevator system
3 tension member
4 hoistway
5 drive
6 elevator control
7a landing control panel
7b elevator car control panel
8 landing
10 elevator car
11 landing door
12 elevator car door
14 car guide member
20 winding overhang
22 cylindrical wall
24 winding supported
25 electric winding
26 opening
28a-28e grooves
30a-30c wires
32 inner space
34 outer area
36 end surface
37 inner circumference
38 outer circumference
40 motor
42 sheave or drum
44 rotating shaft
46 stator
48 rotor
50 post
52 gap
54 web
56 base
A center axis
d1, d2, d3, d4, d5 predefined distances
$H_0$ height of the posts
H1, H2, H3, H4, H5 heights of the slots
h1, h2 heights of the webs
W width of the grooves

What is claimed is:

1. Winding overhang (20) configured for supporting windings of an electric motor (40), the winding overhang (20) comprising a cylindrical wall (22) having an end surface (36) and a circumference (37, 38) extending around a center axis (A), the cylindrical wall (22) including:
   a plurality of grooves (28a-28e) formed along the circumference (37, 38) of the cylindrical wall (22); and
   a plurality of openings (26) extending from the end surface (36) of the cylindrical wall (22) to a respective one of the grooves (28a-28e) and allowing a wire (30a-30c) to pass through the cylindrical wall (22) between an outer area (34) outside the cylindrical wall (22) and an inner space (32) defined by the cylindrical wall (22);
   wherein the openings (26) have different heights (H1, H2, H3, H4, H5), so that adjacent openings (26) extend to different ones of said grooves (28a-28e);
   wherein the cylindrical wall (22) is formed by a plurality of posts (50) arranged next to each other with gaps (52) formed between adjacent posts (50) and with webs (54) bridging the gaps (52) at different heights (H1, H2, H3, H4, H5).

2. Winding overhang (20) according to claim 1, wherein the openings (26) extend parallel to the center axis (A).

3. Winding overhang (20) according to claim 1, wherein each groove (28a-28e) has a basically constant width (W) along the circumference (37, 38) of the cylindrical wall (22).

4. Winding overhang (20) according to claim 1, wherein the grooves (28a-28e) are equidistantly spaced apart from each other in a direction extending parallel to the center axis (A), and/or wherein three to five grooves (28a-28e) are formed within the cylindrical wall (22).

5. Winding overhang (20) according to claim 1, further comprising winding supports (24) extending from the cylindrical wall (22) into the inner space (32), each winding support (24) configured for supporting an electric winding (25).

6. Stator or rotor of an electric motor comprising:
   the winding overhang according to claim 1; and a plurality of electric windings arranged along the cylindrical wall;

wherein wires forming the electric windings pass through the openings formed within the cylindrical wall between the inner space and the outer area outside the cylindrical wall, wherein only a single wire passes through each of the openings, respectively.

7. Stator or rotor according to claim 6, wherein the wires extend within the grooves formed along the circumference of the cylindrical wall, wherein each groove accommodates not more than one wire in each angular section of the cylindrical wall.

8. Stator (46) or rotor (48) according to claim 6, wherein each wire (30a-30c) passes from one of the grooves (28a-28e) through one of the openings (26) from the outer area (34) into the inner space (32), forms an electric winding (25) on one of the winding supports (24), and passes through another one of the openings (26) from the inner space (32) to the outer area (34) and into another one of the grooves (28a-28e).

9. Electric motor comprising the stator or the rotor according to claim 6.

10. Elevator drive comprising the electric motor according to claim 9.

11. Elevator system (2) comprising:
at least one elevator car (10) configured for travelling within a hoistway (4) between a plurality of landings (8); and
at least one elevator drive (5) according to claim 10 configured for driving the at least one elevator car (10).

12. Method of forming a stator (46) or a rotor (48) on a winding overhang (20) according to claim 1, wherein the method includes:
forming and/or arranging electric windings (25); and
passing wires (30a-30c) extending from the ends of the electric windings (25) through the openings (26) formed within the cylindrical wall (22).

13. Method of claim 12, wherein not more than a single wire (30a-30c) is passed through each of the openings (26), respectively.

14. Method of claim 12, wherein the method further includes arranging each of the wires (30a-30c) in a groove (28a-28e) formed along the circumference (37, 38) of the cylindrical wall (22).

* * * * *